(12) United States Patent
Mizushima et al.

(10) Patent No.: US 8,222,318 B2
(45) Date of Patent: Jul. 17, 2012

(54) WATER-BASED INKS FOR INK-JET PRINTING

(75) Inventors: Ryuma Mizushima, Wakayama (JP); Nobuyuki Takizawa, Wakayama (JP)

(73) Assignee: Kao Corporation, Tokyo (JP)

( * ) Notice: Subject to any disclaimer, the term of this patent is extended or adjusted under 35 U.S.C. 154(b) by 433 days.

(21) Appl. No.: 12/519,798

(22) PCT Filed: Dec. 13, 2007

(86) PCT No.: PCT/JP2007/074584
§ 371 (c)(1),
(2), (4) Date: Jun. 18, 2009

(87) PCT Pub. No.: WO2008/075750
PCT Pub. Date: Jun. 26, 2008

(65) Prior Publication Data
US 2010/0036048 A1  Feb. 11, 2010

(30) Foreign Application Priority Data

Dec. 19, 2006 (JP) ................................ 2006-341884
Oct. 9, 2007 (JP) ................................ 2007-263533

(51) Int. Cl.
*A61K 9/16* (2006.01)
*B41J 2/07* (2006.01)
*B41J 2/17* (2006.01)
*B14J 2/175* (2006.01)
*C08F 6/00* (2006.01)
*C08F 220/12* (2006.01)
*C08G 18/42* (2006.01)
*C08J 3/00* (2006.01)
*C08J 3/09* (2006.01)
*C08J 3/12* (2006.01)
*C09D 5/00* (2006.01)
*C09D 11/00* (2006.01)
*G01D 11/00* (2006.01)

(52) U.S. Cl. ................ 523/160; 347/1; 347/85; 347/95; 347/100; 523/161; 523/303; 523/305; 523/332; 523/336; 523/339; 523/340; 523/342; 524/500; 524/543

(58) Field of Classification Search .................. 523/160, 523/161, 303, 305, 332, 336, 339, 340, 342; 524/500, 543; 347/1, 85, 100, 95
See application file for complete search history.

(56) References Cited

U.S. PATENT DOCUMENTS

| 2,322,072 | A | 6/1943 | Thomas |
| 2,462,564 | A | 2/1949 | Skeen |
| 2,910,460 | A | 10/1959 | Aries |
| 3,715,344 | A | 2/1973 | Natta et al. |
| 2003/0144470 | A1 | 7/2003 | Sheehan |
| 2004/0171773 | A1 | 9/2004 | Bu et al. |

FOREIGN PATENT DOCUMENTS

| EP | 1 215 251 A1 | 6/2002 |
| WO | WO-02/28916 A2 | 4/2002 |
| WO | WO-2005/061590 A1 | 7/2005 |
| WO | WO-2006/046759 A1 | 5/2006 |
| WO | WO-2006/049291 A1 | 5/2006 |
| WO | WO-2006/054787 A1 | 5/2006 |
| WO | WO-2006/095794 A1 | 9/2006 |

OTHER PUBLICATIONS

Office Action in Chinese Application No. 200780045578.7, mailed Jun. 15, 2011, including an English translation.
Office Action issued on Sep. 13, 2011 in corresponding Great Britain Patent Application No. GB0910490.2.

*Primary Examiner* — Patrick Niland
(74) *Attorney, Agent, or Firm* — Birch, Stewart, Kolasch & Birch, LLP

(57) ABSTRACT

The present invention relates to (1) a process for producing a water dispersion for ink-jet printing containing colorant-containing polymer particles which includes a step I of obtaining a dispersion of colorant-containing polymer particles; a step II of obtaining a water dispersion of the colorant-containing polymer particles from the dispersion obtained in the step I; a step III of mixing the water dispersion obtained in the step II with an organic solvent (B) to suitably control a relative dielectric constant of a mixed solvent in the resultant dispersion, thereby precipitating the colorant-containing polymer particles; and a step IV of separating precipitates obtained in the step III from the dispersion and re-dispersing the precipitates in a water-based solvent; (2) a water-based ink for ink-jet printing which is excellent in ejection stability and optical density; (3) a process for purifying a water dispersion for ink-jet printing; and (4) a process for producing a dispersion containing groups of fine particles.

9 Claims, No Drawings

WATER-BASED INKS FOR INK-JET PRINTING

FIELD OF THE INVENTION

The present invention relates to water-based inks for ink-jet printing, a process for producing water dispersions used in the water-based inks, a process for purifying the water dispersions, and a process for producing dispersions containing groups of fine particles.

BACKGROUND OF THE INVENTION

In ink-jet printing methods, droplets of ink are directly projected onto a recording medium from very fine nozzles and allowed to adhere to the recording medium to form characters and images. The ink-jet printing methods have been rapidly spread because of their various advantages such as easiness of full coloration, low costs, capability of using a plain paper as the recording medium, non-contact with printed images and characters, etc.

Among such printing methods, in view of enhancing the weather resistance and water resistance of printed images and characters, an ink-jet printing method utilizing an ink containing a pigment as the colorant has now come to dominate.

JP 10-292143A discloses a water-based ink used in a thermal printing method of injecting an ink by the action of bubbles generated upon heating the ink, which includes a water dispersion containing a colored microcapsule obtained by covering a pigment with a film-forming resin. However, the film-forming resin component is a water-soluble polymer or a self-dispersible polymer and, therefore, is dissolved in the ink, thereby failing to allow the ink to exhibit a satisfactory ejecting property.

JP 2003-138176A discloses a method of improving an ejecting property of a water-based ink containing a water dispersion of colorant-containing polymer particles by subjecting the water-based ink to membrane treatment or centrifugal separation treatment to thereby remove a water-soluble polymer and a self-dispersible polymer from the water dispersion. However, this method has failed to attain satisfactory purification efficiency and productivity.

JP 2006-152270A discloses a method of purifying a colorant-containing water-insoluble polymer with a solvent having a specific solubility parameter to improve an optical density and an anti-bleeding property of an ink. However, the ink obtained by this method tends to be unsatisfactory in ejecting property.

In recent years, with a highly precise structure of a printing head, a diameter of nozzles provided therein tends to be reduced, and besides with the increase in printing speed, there is an increasing demand for further improving an ejecting property of an ink.

SUMMARY OF THE INVENTION

The present invention relates to (1) a process for producing a water dispersion for ink-jet printing containing particles of a polymer which contain a colorant, including the following steps I to IV:

Step I: dispersing a mixture containing a polymer, a colorant, an organic solvent (A) and water to obtain a dispersion of colorant-containing polymer particles;

Step II: removing the organic solvent (A) from the dispersion obtained in the step I to obtain a water dispersion of the colorant-containing polymer particles;

Step III: mixing the water dispersion obtained in the step II with an organic solvent (B) to control a relative dielectric constant ($\alpha$) of a mixed solvent of a dispersing medium of the water dispersion and the organic solvent (B), thereby precipitating the polymer particles; and Step IV: separating precipitates obtained in the step III from the dispersion and re-dispersing the precipitates in a water-based solvent, (2) a water-based ink for ink-jet printing containing the water dispersion; (3) a process for purifying the water dispersion; and (4) a process for producing a dispersion containing groups of fine particles.

DETAILED DESCRIPTION OF THE INVENTION

The present invention relates to a water-based ink for ink-jet printing which exhibits excellent ejection stability and optical density, a process for producing a water dispersion of colorant-containing polymer particles which is used for the water-based ink, a process for purifying the water dispersion, and further a process for producing a dispersion containing groups of fine particles which is applicable to water-based inks for ink-jet printing, etc.

The present inventors have found that when mixing a water dispersion of colorant-containing polymer particles with an organic solvent to suitably control a relative dielectric constant of a mixed solvent in the resultant dispersion and thereby precipitate the polymer particles, the obtained water-based ink can exhibit a high ejection stability and a high optical density.

Thus, the present invention relates to the following aspects (1) to (4):

(1) A process for producing a water dispersion for ink-jet printing containing particles of a polymer which contain a colorant, including the following steps I to IV:

Step I: dispersing a mixture containing a polymer, a colorant, an organic solvent (A) and water to obtain a dispersion of colorant-containing polymer particles;

Step II: removing the organic solvent (A) from the dispersion obtained in the step I to obtain a water dispersion of the colorant-containing polymer particles;

Step III: mixing the water dispersion obtained in the step II with an organic solvent (B) to control a relative dielectric constant ($\alpha$) of a mixed solvent of a dispersing medium of the water dispersion and the organic solvent (B), thereby precipitating the polymer particles; and Step IV: separating precipitates obtained in the step III from the dispersion and re-dispersing the precipitates in a water-based solvent.

(2) A water-based ink for ink-jet printing including the water dispersion as defined in the above aspect (1).

(3) A process for purifying a water dispersion for ink-jet printing containing particles of a polymer which contain a colorant, including the following steps 1 and 2:

Step 1: mixing the water dispersion of colorant-containing polymer particles with an organic solvent (B) to control a relative dielectric constant ($\alpha$) of a mixed solvent of a dispersing medium of the water dispersion and the organic solvent (B), thereby precipitating the polymer particles; and Step 2: separating precipitates obtained in the step I from the dispersion and re-dispersing the precipitates in a water-based solvent.

(4) A process for producing a dispersion containing groups of fine particles, including the following steps i, and ii or iii:

Step i: mixing a water dispersion containing 2 or more kinds of groups of fine particles which are different in zeta potential from each other, with an organic solvent to control a relative dielectric constant ($\alpha$) of a mixed solvent of a dispersing medium of the water dispersion and the organic solvent, thereby precipitating the group of fine particles having a small absolute value of zeta potential;

Step ii: separating precipitates obtained in the step i from the dispersion and re-dispersing the precipitates in a solvent having a larger relative dielectric constant than the relative dielectric constant ($\alpha$) of the mixed solvent, thereby obtaining a dispersion containing the group of fine particles having a small absolute value of zeta potential; and Step iii: separating and removing the precipitates obtained in the step i from the dispersion to obtain a dispersion containing the group of fine particles having a large absolute value of zeta potential.

The process for producing a water dispersion for ink-jet printing according to the present invention is characterized by including the above steps I to IV. The respective components used in the present invention are explained below. Meanwhile, the particles of a polymer which contain a colorant are hereinafter occasionally referred to merely as "colorant-containing polymer particles".

(Colorant)

The colorant used in the present invention is not particularly limited, and there may be used any of pigment, hydrophobic dye, and water-soluble dye such as acid dye, reactive dye and direct dye. The colorant used in the present invention is preferably pigment or hydrophobic dye in view of a good water resistance, a good dispersion stability and a good rubbing resistance. Among these colorants, to meet the recent strong demand for a high weather resistance, preferred is the pigment.

The pigment or hydrophobic dye used in the water-based ink is required to be present in the form of stable fine particles using a surfactant or a polymer. In particular, in view of a good anti-bleeding property and a good water resistance, the pigment and/or hydrophobic dye is preferably included in the polymer particles.

The pigment may be either inorganic or organic. The inorganic or organic pigment may be used in combination with an extender pigment, if required.

Examples of the inorganic pigments include carbon blacks, metal oxides, metal sulfides and metal chlorides. Among these inorganic pigments, carbon blacks are preferably used for black water-based inks. The carbon blacks may include furnace blacks, thermal lamp blacks, acetylene blacks and channel blacks.

Examples of the organic pigments include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments.

Specific examples of the preferred organic pigments include one or more pigments selected from the group consisting of commercially available products marketed under the tradenames C.I. Pigment Yellow, C.I. Pigment Red, C.I. Pigment Violet, C.I. Pigment Blue and C.I. Pigment Green, etc., with various product numbers.

Examples of the extender pigment include silica, calcium carbonate and talc.

The hydrophobic dyes are not particularly limited as long as they are capable of being included in the polymer particles. To allow the dye to efficiently become included in the polymer, the solubility of the hydrophobic dye is preferably 2 g/L or more preferably from 20 to 500 g/L as measured at 25° C. on the basis of the organic solvent used upon the production of the polymer, such as preferably methyl ethyl ketone.

Examples of the hydrophobic dyes include oil-soluble dyes and disperse dyes. Among these dyes, preferred are oil-soluble dyes. Examples of the oil-soluble dyes include one or more dyes selected from the group consisting of commercially available products marketed from Orient Chemical Co., Ltd., BASF AG, etc., under the tradenames C.I. Solvent Black, C.I. Solvent Yellow, C.I. Solvent Red, C.I. Solvent Violet, C.I. Solvent Blue, C.I. Solvent Green, and C.I. Solvent Orange, etc., with various product numbers.

The above colorants may be used alone or in the form of a mixture containing any two or more thereof at an optional mixing ratio.

(Polymer)

The polymer forming the colorant-containing polymer particles used in the present invention is preferably such a water-insoluble polymer exhibiting a solubility in water of 10 g or lower, preferably 5 g or lower and more preferably 1 g or lower when the polymer is dried at 105° C. for 2 h, and then dissolved in 100 g of water at 25° C. The solubility of the polymer having a salt-forming group means a solubility of the polymer whose salt-forming group is neutralized completely (i.e., 100%) with acetic acid or sodium hydroxide according to kind of the salt-forming group.

Examples of the polymer used in the present invention include polyesters, polyurethanes and vinyl polymers. Among these polymers, preferred are vinyl polymers obtained by addition polymerization of vinyl monomers such as vinyl compounds, vinylidene compounds and vinylene compounds in view of a good dispersion stability thereof.

(Vinyl Polymer)

The vinyl polymer used in the present invention is preferably such a vinyl polymer which is produced by copolymerizing a monomer mixture containing (a) a salt-forming group-containing monomer (hereinafter occasionally referred to merely as a "component (a)"), and (b) a macromer (hereinafter occasionally referred to merely as a "component (b)") and/or (c) a hydrophobic monomer (hereinafter occasionally referred to merely as a "component (c)") (such a mixture is hereinafter referred to merely as a "monomer mixture"). The vinyl polymer contains a constitutional unit derived from the component (a), and a constitutional unit derived from the component (b) and/or a constitutional unit derived from the component (c). The vinyl polymer is more preferably in the form of a graft polymer containing the constitutional unit derived from the component (a) or both the constitutional unit derived from the component (a) and the constitutional unit derived from the component (c) in a main chain thereof, and the constitutional unit derived from the component (b) in a side chain thereof, and more preferably in the form of a graft polymer containing the constitutional units derived from the components (a) and (c) in a main chain thereof, and the constitutional unit derived from the component (b) in a side chain thereof.

(Salt-Forming Group-Containing Monomer (a))

The salt-forming group-containing monomer (a) is used for enhancing a dispersion stability of the resultant water dispersion. Examples of the salt-forming group include a carboxyl group, a sulfonic group, a phosphoric group, an amino group and an ammonium group. Among these salt-forming groups, especially preferred is a carboxyl group.

Examples of the salt-forming group-containing monomers include cationic monomers and anionic monomers as described in the paragraph [0022] of JP 9-286939A, etc.

Typical examples of the cationic monomers include unsaturated amine-containing monomers and unsaturated ammonium salt-containing monomers. Among these cationic monomers, preferred are N,N-dimethylaminoethyl (meth) acrylate, N-(N',N'-dimethylaminopropyl)(meth)acrylamide and vinyl pyrrolidone.

Typical examples of the anionic monomers include unsaturated carboxylic acid monomers, unsaturated sulfonic acid monomers and unsaturated phosphoric acid monomers.

Examples of the unsaturated carboxylic acid monomers include acrylic acid, methacrylic acid, crotonic acid, itaconic acid, maleic acid, fumaric acid, citraconic acid and 2-methacryloyloxymethylsuccinic acid. Examples of the unsaturated sulfonic acid monomers include styrenesulfonic acid, 2-acrylamido-2-methylpropanesulfonic acid, 3-sulfopropyl (meth)acrylate and bis(3-sulfopropyl)itaconic ester. Examples of the unsaturated phosphoric acid monomers include vinylphosphonic acid, vinyl phosphate, bis(methacryloxyethyl)phosphate, diphenyl-2-acryloyloxyethyl phosphate, diphenyl-2-methacryloyloxyethyl phosphate and dibutyl-2-acryloyloxyethyl phosphate.

Among the above anionic monomers, in view of a good dispersion stability and a good ejecting stability of the resultant inks, preferred are the unsaturated carboxylic acid monomers, and more preferred are acrylic acid and methacrylic acid.

(Macromer (b))

The macromer (b) is used for enhancing a dispersion stability of the colorant-containing polymer particles. The macromer (b) is in the form of a monomer containing a polymerizable unsaturated group which has a number-average molecular weight of from 500 to 100,000 and preferably from 1,000 to 10,000. Meanwhile, the number-average molecular weight of the macromer (b) may be measured by gel chromatography using chloroform containing 1 mmol/L of dodecyl dimethylamine as a solvent and using polystyrene as a standard substance.

Among these macromers (b), in view of a good dispersion stability of the colorant-containing polymer particles, etc., preferred are styrene-based macromers and aromatic group-containing (meth)acrylate-based macromers which have a polymerizable functional group at one terminal end thereof.

Examples of the styrene-based macromers include homopolymers of styrene-based monomers, and copolymers of the styrene-based monomers with other monomers. Examples of the styrene-based monomers include styrene, 2-methyl styrene, vinyl toluene, ethylvinyl benzene, vinyl naphthalene and chlorostyrene.

As the aromatic group-containing (meth)acrylate-based macromers, there are used homopolymers of an aromatic group-containing (meth)acrylate and copolymers of the aromatic group-containing (meth)acrylate with other monomers. Examples of the aromatic group-containing (meth)acrylate include (meth)acrylates containing an arylalkyl group having 7 to 22 carbon atoms, preferably 7 to 18 carbon atoms and more preferably 7 to 12 carbon atoms which may have a substituent group containing a hetero atom, or an aryl group having 6 to 22 carbon atoms, preferably 6 to 18 carbon atoms and more preferably 6 to 12 carbon atoms which may have a substituent group containing a hetero atom. Examples of the substituent group containing a hetero atom include a halogen atom, an ester group, an ether group and a hydroxyl group. Examples of the aromatic group-containing (meth)acrylate include benzyl (meth)acrylate, phenoxyethyl (meth)acrylate, 2-hydroxy-3-phenoxypropyl acrylate and 2-methacryloyloxyethyl-2-hydroxypropyl phthalate. Among these aromatic group-containing (meth)acrylates, preferred is benzyl (meth) acrylate.

The polymerizable functional group bonded to one terminal end of these macromers is preferably an acryloyloxy group or a methacryloyloxy group. Examples of the preferred other monomers copolymerizable with the aromatic group-containing (meth)acrylate include acrylonitrile, etc.

The content of the constitutional unit derived from the styrene-based monomer in the styrene-based macromer or the content of the constitutional unit derived from the aromatic group-containing (meth)acrylate in the aromatic group-containing (meth)acrylate-based macromer is preferably 50% by weight or more and more preferably 70% by weight or more in view of enhancing an affinity to colorants.

The macromer (b) may further contain a side chain composed of other constitutional units derived from an organopolysiloxane, etc. Such a side chain may be produced, for example, by copolymerizing with the macromer, a silicone-based macromer having a polymerizable functional group at one terminal end thereof which is represented by the following formula (1):

$$CH_2=C(CH_3)-COOC_3H_6-[Si(CH_3)_2-O]_t-Si(CH_3)_3 \qquad (1)$$

wherein t is a number of from 8 to 40.

The styrene-based macromer as the component (b) is commercially available, for example, from Toagosei Co., Ltd., as product names of AS-6(S), AN-6(S), HS-6(S), AS-3(S), etc.

(Hydrophobic Monomer (c))

The hydrophobic monomer (c) is used for enhancing an optical density of the resultant ink. Examples of the hydrophobic monomer (c) include alkyl (meth)acrylates and aromatic group-containing monomers.

The preferred alkyl (meth)acrylates are those containing an alkyl group having 1 to 22 carbon atoms and preferably 6 to 18 carbon atoms. Examples of the alkyl (meth)acrylates include methyl (meth)acrylate, ethyl (meth)acrylate, (iso) propyl (meth)acrylate, (iso- or tertiary-)butyl (meth)acrylate, (iso)amyl (meth)acrylate, cyclohexyl (meth)acrylate, 2-ethylhexyl (meth)acrylate, (iso)octyl (meth)acrylate, (iso)decyl (meth)acrylate, (iso)dodecyl (meth)acrylate and (iso)stearyl (meth)acrylate.

Meanwhile, the terms "(iso- or tertiary-)" and "(iso)" used herein mean both the structure in which the groups expressed by "iso" and "tertiary" are present, and the structure in which these groups are not present (i.e., normal). and the "(meth) acrylate" means acrylate, methacrylate or both thereof.

The aromatic group-containing monomer may contain a substituent group having a hetero atom, and is preferably a vinyl monomer containing an aromatic group having 6 to 22 carbon atoms, preferably 6 to 18 carbon atoms and more preferably 6 to 12 carbon atoms. Examples of the aromatic group-containing monomer include the above styrene-based monomer (component c-1), and the above aromatic group-containing (meth)acrylate (component c-2). Examples of the substituent group having a hetero atom include those exemplified previously.

Among these components (c), in view of enhancing an optical density, preferred is the styrene-based monomer (component c-1). Among these styrene-based monomers (component c-1), especially preferred are styrene and 2-methyl styrene. The content of the component (c-1) in the component (c) is preferably from 10 to 100% by weight and more preferably from 20 to 80% by weight in view of enhancing an optical density.

Also, examples of the preferred aromatic group-containing (meth)acrylate as the component (c-2) include benzyl (meth) acrylate and phenoxyethyl (meth)acrylate. The content of the component (c-2) in the component (c) is preferably from 10 to 100% by weight and more preferably from 20 to 80% by weight in view of enhancing an optical density and a gloss. Further, the components (c-1) and (c-2) are preferably used in combination with each other.
(Hydroxyl-Containing Monomer (d))

The monomer mixture may further contain (d) a hydroxyl-containing monomer (hereinafter occasionally referred to merely as a "component (d)"). The hydroxyl-containing monomer (d) is used in order to exhibit an excellent effect of enhancing a dispersion stability.

Examples of the component (d) include 2-hydroxyethyl (meth)acrylate, 3-hydroxypropyl (meth)acrylate, polyethylene glycol (n=2 to 30 wherein n represents an average molar number of addition of oxyalkylene groups: this definition is similarly applied to the following descriptions) (meth)acrylate, polypropylene glycol (n=2 to 30) (meth)acrylate, and poly(ethylene glycol (n=1 to 15)/propylene glycol (n=1 to 15) (meth)acrylate. Among these hydroxyl-containing monomers, preferred are 2-hydroxyethyl (meth)acrylate, polyethylene glycol monomethacrylate and polypropylene glycol methacrylate.
(Monomer (e) Represented by the Following Formula (2))

The monomer mixture may further contain (e) a monomer (hereinafter occasionally referred to merely as a "component (e)") represented by the following formula (2):

wherein $R^1$ is a hydrogen atom or a lower alkyl group having 1 to 5 carbon atoms; $R^2$ is a divalent hydrocarbon group having 1 to 30 carbon atoms which may contain a hetero atom; $R^3$ is a monovalent hydrocarbon group having 1 to 30 carbon atoms and preferably a monovalent alkyl group having 1 to 5 carbon atoms or an aryl group or an arylalkyl group having 6 to 30 carbon atoms, which may contain a hetero atom; and q represents an average molar number of addition of $R^2O$ groups, and is a number of from 1 to 60 and preferably a number of from 1 to 30.

The component (e) is used in order to exhibit an excellent effect of enhancing an ejection property of the resultant ink.

Examples of the hetero atom contained in the component (e) of the formula (2) include a nitrogen atom, an oxygen atom, a halogen atom and a sulfur atom.

Examples of the suitable $R^1$ group include methyl, ethyl and (iso)propyl.

Examples of the suitable $R^2O$ group include oxyethylene, oxytrimethylene, oxypropane-1,2-diyl, oxytetramethylene, oxyheptamethylene, oxyhexamethylene, and an oxyalkanediyl (oxyalkylene) group having 2 to 7 carbon atoms which is constituted from combination of at least two of these groups.

Examples of the suitable $R^3$ group include an aliphatic alkyl group having 1 to 30 carbon atoms, preferably 1 to 20 carbon atoms and more preferably 1 to 5 carbon atoms, an aromatic ring-containing alkyl group having 7 to 30 carbon atoms, a hetero ring-containing alkyl group having 4 to 30 carbon atoms, and a phenyl group which may contain an alkyl group having 1 to 8 carbon atoms such as preferably phenyl and benzyl.

Specific examples of the component (e) include methoxy polyethylene glycol (q in the formula (2): 1 to 30; this definition is similarly applied to the following compounds) (meth)acrylate, methoxy polytetramethylene glycol (q=1 to 30) (meth)acrylate, ethoxy polyethylene glycol (q=1 to 30) (meth)acrylate, octoxy polyethylene glycol (q=1 to 30) (meth)acrylate, polyethylene glycol (q=1 to 30) (meth)acrylate 2-ethylhexyl ether, (iso)propoxy polyethylene glycol (q=1 to 30) (meth)acrylate, butoxy polyethylene glycol (q=1 to 30) (meth)acrylate, methoxy polypropylene glycol (q=1 to 30) (meth)acrylate, and methoxy (ethylene glycol/propylene glycol copolymer) (q=1 to 30: among which the number of ethylene glycol constitutional units is 1 to 29) (meth)acrylate. Among these compounds, preferred are octoxy polyethylene glycol (q=1 to 30) (meth)acrylate and polyethylene glycol (q=1 to 30) (meth)acrylate 2-ethylhexyl ether.

Specific examples of the commercially available components (d) and (e) include polyfunctional acrylate monomers (NK esters) available from Shin-Nakamura Kagaku Kogyo Co., Ltd., such as "M-40G", "M-90G", "M-230G" and "EH-4E"; and BLEMMER Series available from NOF Corporation, such as "PE-90", "PE-200", "PE-350", "PME-100", "PME-200", "PME-400", "PME-1000", "PP-500", "PP-800", "PP-1000", "AP-150", "AP-400", "AP-550", "AP-800", "50PEP-300", "50POEP-800B" and "43PAPE-600B".

These components (a) to (e) are respectively used alone or in the form of a mixture of any two or more thereof.

Upon production of the vinyl polymer, the contents of the above components (a) to (e) in the monomer mixture (contents of non-neutralized components; this definition is similarly applied to the following descriptions) or the contents of the constitutional units derived from the components (a) to (e) in the vinyl polymer are as follows.

The content of the component (a) is preferably from 2 to 40% by weight, more preferably from 2 to 30% by weight and still more preferably from 3 to 20% by weight in view of a good dispersion stability of the resultant water dispersion.

The content of the component (b) is preferably from 1 to 25% by weight and more preferably from 5 to 20% by weight, in particular, in view of enhancing an interaction with the colorant.

The content of the component (c) is preferably from 5 to 98% by weight and more preferably from 10 to 60% by weight in view of enhancing an optical density.

The content of the component (d) is preferably from 5 to 40% by weight and more preferably from 7 to 20% by weight in view of a good dispersion stability of the resultant water dispersion.

The content of the component (e) is preferably from 5 to 50% by weight and more preferably from 10 to 40% by weight in view of a good ejection property of the resultant ink.

The total content of the components (a) and (d) in the monomer mixture is preferably from 6 to 60% by weight and more preferably from 10 to 50% by weight in view of a good dispersion stability of the resultant water dispersion. The total content of the components (a) and (e) in the monomer mixture is preferably from 6 to 75% by weight and more preferably from 13 to 50% by weight in view of a good dispersion stability of the resultant water dispersion and a good ejection property of the resultant ink. The total content of the components (a), (d) and (e) in the monomer mixture is preferably from 6 to 60% by weight and more preferably from 7 to 50% by weight in view of a good dispersion stability of the resultant water dispersion and a good ejection property of the resultant ink.

Also, the weight ratio of the component (a) to a sum of the components (b) and (c) [component (a)/(component (b)+component (c))] is preferably from 0.01 to 1, more preferably from 0.02 to 0.67 and still more preferably from 0.03 to 0.50 in view of a good dispersion stability of the resultant water dispersion and a good optical density of the resultant ink.
(Production of Polymer)

The polymer used in the present invention may be produced by copolymerizing the monomer mixture by known methods such as bulk polymerization, solution polymerization, suspension polymerization and emulsion polymerization. Among these polymerization methods, preferred is the solution polymerization.

The solvent used in the solution polymerization method is preferably an organic polar solvent, although not limited thereto. The organic polar solvent miscible with water may be used in the form of a mixture with water. Examples of the organic polar solvents include aliphatic alcohols having from 1 to 3 carbon atoms such as methanol, ethanol and propanol; ketones such as acetone and methyl ethyl ketone; and esters such as ethyl acetate. Among these solvents, preferred are methanol, ethanol, acetone, methyl ethyl ketone and mixed solvents of at least one thereof with water.

The polymerization may be carried out in the presence of a conventionally known radical polymerization initiator, e.g., azo compounds such as 2,2'-azobisisobutyronitrile and 2,2'-azobis(2,4-dimethylvaleronitrile), and organic peroxides such as t-butyl peroxyoctoate and dibenzoyl oxide.

The amount of the radical polymerization initiator to be used in the polymerization is preferably from 0.001 to 5 mol and more preferably from 0.01 to 2 mol per 1 mol of the monomer mixture.

The polymerization may also be carried out in the presence of a conventionally known chain transfer agent, e.g., mercaptans such as octyl mercaptan and 2-mercapto ethanol, and thiuram disulfides.

The polymerization conditions of the monomer mixture vary depending upon the kinds of radical polymerization initiator, monomers, solvent, etc., to be used, and therefore are not particularly limited. The polymerization is generally conducted at a temperature of preferably from 30 to 100° C. and more preferably from 50 to 80° C. for a period of preferably 1 to 20 h. Further, the polymerization is preferably conducted in an atmosphere of an inert gas such as nitrogen and argon.

After completion of the polymerization reaction, the polymer thus produced may be isolated from the reaction solution by a known method such as reprecipitation and removal of solvent by distillation. The thus obtained polymer may be purified by repeated reprecipitation, membrane separation, chromatography, extraction, etc., for removing unreacted monomers, etc., therefrom.

The weight-average molecular weight of the polymer used in the present invention is preferably from 5,000 to 500,000, more preferably from 10,000 to 400,000, still more preferably from 10,000 to 300,000 and further still more preferably from 20,000 to 300,000 in view of a good gloss and a good dispersion stability of the colorant therein. Meanwhile, the weight-average molecular weight of the polymer may be measured by the method as described in Examples below.

When the vinyl polymer used in the present invention contains a salt-forming group derived from the salt-forming group-containing monomer (a), the salt-forming group is neutralized with a neutralizing agent. As the neutralizing agent, acids or bases may be used according to the kind of the salt-forming group in the polymer. Examples of the neutralizing agent include acids such as hydrochloric acid, acetic acid, propionic acid, phosphoric acid, sulfuric acid, lactic acid, succinic acid, glycolic acid, gluconic acid and glyceric acid, and bases such as lithium hydroxide, sodium hydroxide, potassium hydroxide, ammonia, methylamine, dimethylamine, trimethylamine, ethylamine, diethylamine, triethylamine, triethanolamine and tributylamine.

The degree of neutralization of the salt-forming group is preferably from 10 to 200%, more preferably from 20 to 150% and still more preferably from 50 to 150%.

The degree of neutralization of the anionic salt-forming group is calculated according to the following formula:

$$\{[\text{weight (g) of neutralizing agent/equivalent of neutralizing agent}]/[\text{acid value of polymer (KOH mg/g)} \times \text{weight (g) of polymer}/(56 \times 1000)]\} \times 100$$

The degree of neutralization of the cationic salt-forming group is calculated according to the following formula:

$$\{[\text{weight (g) of neutralizing agent/equivalent of neutralizing agent}]/[\text{amine value of polymer (HCl mg/g)} \times \text{weight (g) of polymer}/(36.5 \times 1000)]\} \times 100$$

The acid value or amine value may be calculated from the respective constitutional units of the polymer, or may also be determined by the method of subjecting a solution prepared by dissolving the polymer in an appropriate solvent such as, for example, methyl ethyl ketone to titration.

(Production of Water Dispersion of Colorant-Containing Polymer Particles)

The process for producing the water dispersion of the colorant-containing polymer particles according to the present invention includes the following steps I to IV.

Step I: dispersing a mixture containing a polymer, a colorant, an organic solvent (A) and water to obtain a dispersion of colorant-containing polymer particles;

Step II: removing the organic solvent (A) from the dispersion obtained in the step I to obtain a water dispersion of the colorant-containing polymer particles;

Step III: mixing the water dispersion obtained in the step II with an organic solvent (B) to control a relative dielectric constant ($\alpha$) of a mixed solvent of a dispersing medium of the water dispersion and the organic solvent (B), thereby precipitating the polymer particles; and Step IV: separating precipitates obtained in the step III from the dispersion and re-dispersing the precipitates in a water-based solvent.

(Step I)

In the step I, preferably, the above polymer are first dissolved in the organic solvent (A), and then the colorant and water, if required, together with a neutralizing agent, a surfactant, etc., are added to the resultant organic solvent solution and mixed together to thereby obtain a dispersion of an oil-in-water type. The content of the colorant in the mixture is preferably from 5 to 50% by weight and more preferably from 10 to 40% by weight; the content of the organic solvent (A) in the mixture is preferably from 10 to 70% by weight and more preferably from 10 to 50% by weight; the content of the polymer in the mixture is preferably from 2 to 40% by weight and more preferably from 3 to 20% by weight; and the content of water in the mixture is preferably from 10 to 70% by weight and more preferably from 20 to 70% by weight.

When the polymer contains a salt-forming group, the neutralizing agent is preferably used in the mixture. The degree of neutralization of the salt-forming group in the polymer when using the neutralizing agent is not particularly limited. In general, the degree of neutralization is preferably controlled such that the finally obtained water dispersion exhibits a neutral liquid property, for example, a pH of 4.5 to 10. The pH of the dispersion may also be determined from the desired degree of neutralization for the polymer. Examples of the neutralizing agent used in the present invention include those exemplified above. In addition, the polymer may be previously neutralized.

Examples of the organic solvent (A) preferably include one or more solvents selected from the group consisting of alcohol solvents such as ethanol, isopropanol and isobutanol; ketone solvents such as acetone, methyl ethyl ketone and diethyl ketone; and ether solvents such as dibutyl ether, tetrahydrofuran and dioxane. The solubility of these organic solvent in 100 g of water is preferably 5 g or higher and more preferably 10 g or higher, more specifically preferably from 5 to 80 g and more preferably from 10 to 50 g as measured at 20° C. Among these organic solvents, preferred is methyl ethyl ketone. These organic solvents (A) may be used alone or in the form of a mixture of any two or more thereof.

The method for dispersing the mixture in the step I is not particularly limited. The polymer particles may be finely divided into fine particles having a desired average particle size only by a substantial dispersion procedure. Preferably, the mixture is first subjected to a preliminary dispersion procedure, and then to the substantial dispersion procedure by applying a shear stress thereto so as to control the average particle size of the obtained polymer particles to a desired value. The dispersion procedure in the step I is preferably conducted at a temperature of from 5 to 50° C. and more preferably from 10 to 35° C.

Upon subjecting the mixture to the preliminary dispersion procedure, there may be used ordinary mixing or stirring devices such as anchor blades. Examples of the preferred mixing or stirring devices include high-speed mixers or stirrers such as "Ultra Disper" (tradename: available from Asada Tekko Co., Ltd., "Ebara Milder" (tradename: available from EBARA Coop.), "TK Homomixer", "TK Pipeline Mixer", "TK Homo Jetter", "TK Homomic Line Flow" and "Filmix" (tradenames: all available from PRIMIX Corp.), "Clearmix" (tradename: available from M-Technic Co., Ltd.) and "K.D. Mill" (tradename: available from Kinetics Dispersion Inc.).

To apply the shear stress to the mixture in the substantial dispersion procedure, there may be used, for example, kneading machines such as roll mills, beads mills, kneaders and extruders, homo-valve-type high-pressure homogenizers such as typically "High-Pressure Homogenizer" (tradename: available from Izumi Food Machinery Co., Ltd.) and "Mini-Labo 8.3H Model" (tradename: available from Rannie Corp.), and chamber-type high-pressure homogenizers such as "Micro Fluidizer" (tradename: available from Microfluidics Inc.), "Nanomizer" (tradename: available from Nanomize-r Co., Ltd.), "Altimizer" (tradename: available from Sugino Machine Co., Ltd.), "Genus PY" (tradename: available from Hakusui Kagaku Co., Ltd.) and "DeBEE 2000" (tradename: Nippon BEE Co., Ltd.). These apparatuses may be used in combination of any two or more thereof. Among these apparatuses, in the case where the pigment is contained in the mixture, the high-pressure homogenizers are preferred in view of reducing a particle size of the pigment.
(Step II)

In the step II, the organic solvent (A) is removed from the thus obtained dispersion by known methods to render the dispersion aqueous, thereby obtaining a water dispersion of the colorant-containing polymer particles. The organic solvent (A) is preferably substantially completely removed from the thus obtained water dispersion of the polymer particles. However, the residual organic solvent may be present in the water dispersion unless the objects and effects of the present invention are adversely affected by the residual organic solvent. The content of the residual organic solvent (A) in the resultant water dispersion is preferably 0.1% by weight or lower and more preferably 0.01% by weight or lower.

In the thus-obtained water dispersion of the colorant-containing polymer particles, a solid component made of the colorant-containing polymer is dispersed in water as a main solvent. The configuration of the polymer particles is not particularly limited as long as the particles are formed from at least the colorant and the polymer. Examples of the configuration of the polymer particles include the particle configuration in which the colorant is enclosed in the respective polymer particles, the particle configuration in which the colorant is uniformly dispersed in the respective polymer particles, and the particle configuration in which the colorant is exposed onto a surface of the respective polymer particles.
(Step III)

In the step III, the water dispersion of the colorant-containing polymer particles which is obtained in the step II is mixed with the organic solvent (B) to control a relative dielectric constant ($\alpha$) of a mixed solvent in the resultant dispersion, thereby precipitating the colorant-containing polymer particles. As a result, the colorant-containing polymer particles are selectively aggregated together and separated from the dispersion. Meanwhile, the mixed solvent means a mixed solvent composed of a dispersing medium (mainly water) of the water dispersion obtained in the step II and the organic solvent (B).

The water dispersion obtained in the step II may contain colorant-non-containing polymer particles, polymer particles peeled and separated from the colorant owing to centrifugal separation, etc., in addition to the colorant-containing polymer particles. Also, in the water-based ink, the polymer may be peeled or separated, and, as a result, liberated from the colorant by the action of a vehicle component in the ink in some cases. These polymers are hereinafter generally referred to as an "free polymer". In the ink-jet printers of a thermal printing type, if the content of the free polymer in the ink is too large, the free polymer tends to be attached onto a surface of a heater or a head portion, thereby failing to form suitable bubbles and resulting in occurrence of deflection of printed images or characters as well as failed ejection of the ink. Therefore, it is desirable that the content of the free polymer in the water-based ink is small.

In the step III, the mixed solvent is preferably formed into a uniform solvent, and by suitably controlling a relative dielectric constant of the mixed solvent, the colorant-containing polymer particles are precipitated while keeping the free polymer in the state dispersed in the water dispersion, thereby efficiently separating the colorant-containing polymer particles from the dispersion.

In this case, the reason why the colorant-containing polymer particles are aggregated together while keeping the free polymer in the state dispersed in the water dispersion, is considered as follow.

That is, the free polymer is a component having a lower adsorptivity to pigments among the polymers used in the dispersion. Therefore, it is considered that the free polymer includes a large amount of an electrically charged component derived from the above component (a) as a dispersion stabilizing group, resulting in a large absolute value of zeta potential thereof than that of the colorant-containing polymer particles. On the other hand, the polymer contained in the colorant-containing polymer particles is a component having a higher adsorptivity to pigments among the polymers used in the dispersion. Therefore, it is considered that the polymer contained in the colorant-containing polymer particles includes a larger amount of a hydrophobic component derived from the above components (b) and (c), and has a small absolute value of zeta potential as compared to that of the free polymer. From these viewpoints, it is considered that the free polymer has a higher dispersion stability than the polymer contained in the colorant-containing polymer particles.

Thus, the polymer contained in the colorant-containing polymer particles and the free polymer can be separated from each other by utilizing the difference in dispersion stability (difference in zeta potential) therebetween. More specifically, when the zeta potentials of the polymer contained in the colorant-containing polymer particles and the free polymer are suitably controlled by the relative dielectric constant of the mixed solvent, a boundary region of the relative dielectric constant of the mixed solvent in which the colorant-containing polymer particles are aggregated together while keeping the free polymer still dispersed can be determined. Thus, it is considered that by apparently recognizing the boundary region of the relative dielectric constant ($\alpha$) of the mixed solvent, the free polymer can be efficiently removed from the dispersion.

The aggregation of the colorant-containing polymer particles takes place on the basis of homo-aggregation according to DLVO theory, and the details of the homo-aggregation are described in KITAHARA, Fumio and WATANABE, Masaru "Electrical Surface Phenomenon—Fundamental Study/Measurement/Application-", published by Kyoritsu Shuppan Co., Ltd., 1st Edition, 1972. On the other hand, the aggregation between the colorant-containing polymer particles and the free polymer which is an aggregation between different kinds of particles, is studied on the basis of the theory established by Hogg, Hearly, Futerstenau, et al.

The boundary region of the relative dielectric constant ($\alpha$) of the mixed solvent is determined, for example, by the following method. That is, the water dispersion is forcibly separated into a water dispersion containing the free polymer and a water dispersion containing the colorant-containing polymer particles by conventionally known methods such as centrifugal separation and membrane separation, and both the water dispersions are isolated from each other and respectively mixed with an organic solvent to measure respective relative dielectric constants of solvents at which the colorant-containing polymer particles and the free polymer are respectively aggregated. The relative dielectric constant ($\alpha$) of the mixed solvent may be determined as the value between the thus measured relative dielectric constants. In view of a good separability, the relative dielectric constant of solvent at which the water dispersion of the colorant-containing polymer particles that are more easily aggregated undergoes aggregation is preferably determined as the relative dielectric constant ($\alpha$) of the mixed solvent.

Alternatively, on the basis of the above-mentioned theories, an optimum relative dielectric constant of the dispersion system may also be determined by calculation.

When the relative dielectric constant ($\alpha$) of the mixed solvent is once determined, the amount of the organic solvent to be mixed with the dispersion can be approximated from the known relative dielectric constant of the organic solvent according to the following formula:

Amount of Organic Solvent=[(Relative dielectric constant ($\alpha$) of Mixed Solvent×Amount of Mixed Solvent)−(Relative dielectric constant of Water×Amount of Water)]/Relative dielectric constant of Organic Solvent Upon mixing the water dispersion obtained in the step II with the organic solvent (B), in view of efficiently aggregating the colorant-containing polymer particles, there is preferably used the method of adding the water dispersion obtained in the step II to the organic solvent (B) while preferably stirring the organic solvent (B).

The mixing between the water dispersion and the organic solvent (B) is continued at a temperature of preferably from 5 to 60° C., more preferably from 10 to 50° C. and still more preferably from 20 to 40° C. for a period of about preferably 10 min to about 2 h and more preferably from 30 min to 1 h, thereby precipitating the colorant-containing polymer particles in the mixed solvent.

The stirring of the organic solvent (B) is conducted, for example, by the method of forcibly stirring the solvent using blades having a suitable shape which are mechanically rotated by a stirring motor, the method of stirring the solvent using a magnetic stirrer having a rotor, etc. The rotating speed used upon the stirring is preferably from 50 to 300 rpm, more preferably from 80 to 250 rpm and most preferably from 100 to 200 rpm.

In the step III, a suitable range of the relative dielectric constant ($\alpha$) of the mixed solvent can be determined according to kind of polymer used, kind of colorant used and weight ratio therebetween. In general, the relative dielectric constant ($\alpha$) of the mixed solvent is preferably 27 or more, more preferably 30 or more and still more preferably 33 or more, and preferably 62 or less, more preferably 57 or less, still more preferably 55 or less and further still more preferably 53 or less. From these viewpoints, the suitable range of the relative dielectric constant ($\alpha$) of the mixed solvent is preferably from 27 to 62, more preferably from 27 to 57, still more preferably from 30 to 55 and most preferably from 33 to 53.

Meanwhile, when a magenta pigment having a lower dispersibility than those of cyan and yellow pigments is used as the colorant, it is considered that the amount of the polymer adsorbed in the pigment is small. Therefore, a preferred range of the relative dielectric constant ($\alpha$) of the mixed solvent when using the magenta pigment tends to be lowered as compared to those using the other pigments.

When the relative dielectric constant ($\alpha$) of the mixed solvent is too low, the colorant-containing polymer particles and the free polymer both are precipitated. On the other hand, when the relative dielectric constant ($\alpha$) of the mixed solvent is too high, the colorant-containing polymer particles and the free polymer both are kept dispersed. Namely, when the relative dielectric constant ($\alpha$) of the mixed solvent lies within the above-specified range, the colorant-containing polymer particles are precipitated whereas the free polymer is kept dispersed, thereby easily separating the colorant-containing polymer particles and the free polymer from each other.

When controlling the mixing ratio between water having a relative dielectric constant of 78 as measured at 25° C. and the organic solvent (B) preferably having a relative dielectric constant of from 5 to 40, the relative dielectric constant ($\alpha$) of the mixed solvent can be adjusted to the above preferable range. The mixing ratio between water and the organic solvent (B) is controlled in view of a good separability such that the organic solvent (B) is used in an amount of preferably from 50 to 2,000 parts by weight, more preferably from 100 to 1,000 parts by weight and still more preferably from 100 to 500 parts by weight on the basis of 100 parts by weight of water contained in the water dispersion obtained in the step II. Meanwhile, the relative dielectric constant of the solvent is determined according to the method described in Examples below.

(Organic Solvent (B))

The organic solvent (B) has a relative dielectric constant of preferably from 5 to 40, more preferably from 5 to 35 and still more preferably from 10 to 35 and is preferably capable of forming a uniform mixture with water in view of efficiently dispersing the colorant-containing polymer particles in the resultant mixed solvent.

Examples of the organic solvent (B) having a relative dielectric constant of from 5 to 40 include alcohol solvents and ketone solvent, although not limited to these solvents.

Specific examples of the alcohol solvents include methanol, ethanol, 1-propanol, 2-propanol, 1-butanol, 2-butanol, isobutanol, tert-butanol, 1-pentanol, 2-pentanol, 3-pentanol, 2-methyl-1-butanol, 3-methyl-1-butanol, 2-methyl-2-butanol, 3-methyl-2-butanol, 2,2-dimethyl-1-propanol, 2-ethyl-1-butanol, 1-heptanol, 2-heptanol, 3-heptanol, 4-methyl-2-pentanol, benzyl alcohol, 1-hexanol, cyclohexanol, 1-methyl cyclohexanol, 2-methyl cyclohexanol, 3-methyl cyclohexanol and 4-methyl cyclohexanol. Among these alcohol solvents, especially preferred are methanol, ethanol, 1-propanol, 2-propanol, 1-butanol, 2-butanol, isobutanol and tert-butanol.

Specific examples of the ketone solvents include acetone, methyl ethyl ketone, 2-pentanone, 3-pentanone, 2-hexanone, methyl isobutyl ketone, 2-heptanone, 4-heptanone, diisobutyl ketone, acetonyl acetone, mesityl oxide, phorone, isophorone, cyclohexanone, methyl cyclohexanone and acetophenone. Among these ketone solvents, especially preferred are acetone, methyl ethyl ketone, 2-pentanone, 3-pentanone, 2-hexanone and methyl isobutyl ketone.

Among these organic solvents (B), in view of a good miscibility with the water dispersion, those alcohols and ketones whose solubility in 100 g of water is preferably 5 g or more and more preferably 10 g or more as measured at 20° C. are more suitably used. Also, in view of facilitated removal of the solvent, those alcohols and ketones having a boiling point of 150° C. or lower are preferred. These organic solvents (B) may be used alone or in the form of a mixture of any two or more thereof. In addition, when any of the above illustrated alcohol solvents and ketone solvents is used as the organic solvent (A), the organic solvents (A) and (B) may be either the same or different from each other.

The weight ratio of the solid component in the water dispersion obtained in the step II (total amount of the polymer and the colorant) to the organic solvent (B) [solid component/organic solvent (B)] is preferably from 1/70 to 1/3, more preferably from 1/50 to 1/5 and still more preferably from 1/40 to 1/7. When the weight ratio lies within the above-specified range, the colorant-containing polymer particles are aggregated together whereas the free polymer is kept dispersed, thereby separating the colorant-containing polymer particles and the free polymer from each other in an efficient manner. Meanwhile, the amount of the solid component in the water dispersion (solid content) may be determined according to the method described in Examples below.

(Step IV)

In the step IV, the precipitates obtained in the step III are separated from the dispersion and redispersed in a water-based solvent.

The separation of the precipitates obtained in the step III may be conducted by known methods. Among them, there is preferably used such a method of removing an upper layer component containing the free polymer by centrifugal separation, filtration, filter press, etc., to separate the free polymer from the precipitates of the colorant-containing polymer particles.

The centrifugal separation is conducted at a rotating speed of preferably from 500 to 10,000 rpm and more preferably from 1,000 to 8,000 for a period of preferably from 1 to 60 min and more preferably from 5 to 30 min. In the course of the separation procedure, a slight amount of the organic solvent may remain in the precipitates and may be mixed in the water-based solvent unless the performance of the resultant ink is adversely influenced by the residual organic solvent. However, the organic solvent may be substantially completely removed by known methods before or after the re-dispersion treatment. The amount of the residual organic solvent in the resultant dispersion is preferably 0.1% by weight or lower and more preferably 0.01% by weight or lower.

Next, the thus separated precipitates are redispersed in the water-based solvent preferably by the method of adding the obtained precipitates into water to disperse the precipitates therein. The dispersing method is the same as described in the above step I. The water-based solvent contains water substantially as a main component, and may also contain solvents or additives ordinarily used in inks. Also, the water dispersion of the colorant-containing polymer particles means such a dispersion in which the colorant-containing polymer particles are dispersed in a solvent containing water as a main component.

The process for producing the water dispersion for ink-jet printing according to the present invention is capable of removing the free polymer therefrom efficiently and substantially completely as compared to the conventional methods for purifying the water dispersion by membrane separation or centrifugal separation.

(Purification Process)

The process for purifying the water dispersion for ink-jet printing which contains the colorant-containing polymer particles according to the present invention includes the following steps 1 and 2 which correspond to the above steps III and IV, respectively.

Step 1: mixing the water dispersion of the colorant-containing polymer particles with the organic solvent (B) to control a relative dielectric constant ($\alpha$) of a mixed solvent of a dispersing medium of the water dispersion and the organic solvent (B), thereby precipitating the polymer particles; and Step 2: separating precipitates obtained in the step I from the dispersion and re-dispersing the precipitates in a water-based solvent.

In the purification process of the present invention, the colorant-containing polymer particles and the free polymer are separated from each other by utilizing the difference in dispersion stability therebetween as described above.

The water dispersion of the colorant-containing polymer particles to be subjected to the step 1 may be either the water dispersions obtained in the step I and II of the above production process or water dispersions obtained by other known methods such as precipitation by an acid. The water dispersion contains the solvent containing water as a main component, and may also contain other residual solvents unless the objects and effects of the present invention are adversely affected by the residual solvents.

The purification conditions as well as preferred ranges of these conditions are the same as those used in the above steps III and IV.

The process for purifying the water dispersion for ink-jet printing according to the present invention is capable of removing the free polymer therefrom efficiently and substantially completely as compared to the conventional methods for purifying the water dispersion by membrane separation or centrifugal separation.

(Process for Producing Dispersion Containing Groups of Fine Particles)

The process for producing a dispersion containing groups of fine particles, includes the following steps i, and ii or iii:

Step i: mixing a water dispersion containing 2 or more kinds of groups of fine particles which are different in zeta potential from each other, with an organic solvent to control a relative dielectric constant ($\alpha$) of a mixed solvent of a dispersing medium of the water dispersion and the organic solvent, thereby precipitating the group of fine particles having a small absolute value of zeta potential;

Step ii: separating precipitates obtained in the step i from the dispersion and re-dispersing the precipitates in a solvent having a larger relative dielectric constant than the relative dielectric constant ($\alpha$) of the mixed solvent, thereby obtaining a dispersion containing the group of fine particles having a small absolute value of zeta potential; and Step iii: separating and removing the precipitates obtained in the step i from the dispersion to obtain a dispersion containing the group of fine particles having a large absolute value of zeta potential.

In accordance with the above process, 2 or more kinds of groups of fine particles which are different in zeta potential from each other are easily separated into the individual groups of fine particles in an industrially facilitated manner, thereby obtaining the dispersion containing the aimed group of fine particles. For example, the water dispersion or the water-based ink for ink-jet printing can be efficiently produced from such a dispersion containing a group of colorant-containing polymer fine particles and a group of colorant-non-containing polymer fine particles.

In the step i, there is used the water dispersion containing 2 or more kinds of groups of fine particles which are different in zeta potential from each other. The dispersing medium of the water dispersion is preferably a solvent containing water as a main component. Also, the water dispersion contains a group of fine particles having a large absolute value of zeta potential and a group of fine particles having a small absolute value of zeta potential (hereinafter generally referred to as "both groups of fine particles"), and it is preferred that one of the both groups of fine particles is a group of colorant-containing polymer particles, and the other of the both groups of fine particles is a group of polymer particles containing substantially no colorant. The colorant-containing polymer particles are the same as explained above.

The group of fine particles means a group composed of two or more particles. The zeta potential of the respective groups of fine particles means an average value of zeta potentials of the particles contained in each group, and can be determined by the method described in Examples below. The difference in zeta potential between the both groups of fine particles is preferably 5 mV or larger and more preferably 10 mV or larger.

Whether or not there is any difference in zeta potential between the groups of fine particles can be confirmed by first separating the groups of fine particles into the individual groups by known methods such as centrifugal separation, membrane separation and electrophoresis, and then measuring zeta potentials of the thus separated groups of fine particles.

The range of absolute value of zeta potential of the respective groups of fine particles varies depending upon kinds of groups of fine particles, weight ratio between both the groups of fine particles, etc., and is therefore not particularly limited. In view of a good separability, the group of fine particles having a large absolute value of zeta potential preferably exhibits an absolute value of zeta potential of from 15 to 70 mV and more preferably from 20 to 50 mV, whereas the group of fine particles having a small absolute value of zeta potential preferably exhibits an absolute value of zeta potential of from 0 to 15 mV and more preferably from 5 to 12 mV.

The average particle size of the fine particles contained in the both groups of fine particles is preferably from 0.01 to 0.5 μm, more preferably from 0.03 to 0.3 μm and still more preferably from 0.05 to 0.2 μm. Meanwhile, the average particle size may be measured by using a laser particle analyzing system "ELS-8000" (cumulant analysis) available from Otsuka Denshi Co., Ltd., under the following conditions:
Measuring Conditions:
Temperature: 25° C.;
Angle between incident light and detector: 90°; and
Cumulative frequency: of 100 times Further, a refractive index of water (1.333) is input to the analyzing system as a refractive index of the dispersing medium, and a concentration of the water dispersion to be measured is usually about $5 \times 10^{-3}$% by weight.

In the step i, the water dispersion containing 2 or more kinds of groups of fine particles which are different in zeta potential from each other is mixed with the organic solvent while varying the mixing ratio therebetween to sequentially control a relative dielectric constant ($\alpha$) of a mixed solvent composed of a dispersing medium of the water dispersion and the organic solvent. As a result, the group of fine particles having a small absolute value of zeta potential can be aggregated and precipitated together substantially without causing aggregation between the group of fine particles having a small absolute value of zeta potential and the group of fine particles having a large absolute value of zeta potential.

Alternatively, as described above, the groups of fine particles which are different in zeta potential from each other are forcibly separated into the individual groups by conventionally known methods such as centrifugal separation and membrane separation, and the water dispersion containing each of the both groups of fine particles is mixed with the organic solvent to measure the relative dielectric constant of the solvent at which the fine particles contained therein are aggregated. The relative dielectric constant ($\alpha$) of the mixed solvent may be determined from the value between the thus measured relative dielectric constants. In view of a good separability between the groups of fine particles, the relative dielectric constant at which the water dispersion containing the easily aggregatable group of fine particles undergoes aggregation is preferably determined as the relative dielectric constant ($\alpha$) of the mixed solvent. Meanwhile, the "easy aggregation" means that the absolute value of zeta potential is small, and the relative dielectric constant of the solvent at which aggregation of the fine particles occurs is large.

Also, even when 3 or more kinds of groups of fine particles are contained in the water dispersion, by continuously mixing the organic solvent in the water dispersion to sequentially reduce a relative dielectric constant ($\alpha$) of the mixed solvent, the groups of fine particles may be sequentially aggregated such that the group of fine particles whose aggregation occurs at a larger relative dielectric constant of the solvent is aggregated earlier. Alternatively, the groups of fine particles contained in the water dispersion may be previously separated into the individual groups to determine a relative dielectric constant of the solvent at which the respective groups of fine particles undergoes aggregation. Thereafter, by mixing the organic solvent in the water dispersion, the groups of fine particles may be sequentially aggregated such that the group of fine particles whose aggregation occurs at a larger relative dielectric constant of the solvent is aggregated earlier, thereby similarly conducting separation of the respective groups of fine particles.

The organic solvent used in the step i may be the same as the organic solvent (B), and the mixing method, mixing conditions and the method of controlling the relative dielectric constant of the mixed solvent may also be the same as those described in the above step III.

In the step ii, the obtained precipitates are separated from the dispersion and redispersed in a solvent having a larger relative dielectric constant than the relative dielectric constant ($\alpha$) of the mixed solvent, thereby obtaining a dispersion containing the group of fine particles having a small absolute value of zeta potential. The conditions for the separation and re-dispersion of the precipitates may be the same as those used in the above step IV. The solvent having a larger relative dielectric constant than the relative dielectric constant ($\alpha$) of the mixed solvent is preferably water. The difference between the relative dielectric constant of the solvent and the relative dielectric constant (α) of the mixed solvent is preferably 3 or more and more preferably 5 or more.

In the step iii, contrary to the above step ii, the aggregated precipitates obtained in the step i are separated and removed from the dispersion, so that a dispersion containing the group of fine particles having a large absolute value of zeta potential can be easily produced.

In the process for producing a dispersion containing groups of fine particles according to the present invention, the groups of fine particles which are different in zeta potential from each other can be separated into the individual groups in an industrially facilitated manner as compared to the conventional production processes using centrifugal separation or membrane separation, thereby obtaining a dispersion containing the aimed group of fine particles.

(Water Dispersion of Colorant-Containing Polymer Particles/Water-Based Ink)

The water-based ink for ink-jet printing according to the present invention contains the water dispersion of the colorant-containing polymer particles which is produced according to the production process of the present invention. The water-based ink contains water as a main dispersing medium and may further contain various additives such as wetting agents, dispersants, defoaming agents, mildew-proof agents and chelating agents, if required. The method of mixing the respective components in the water-based ink is not particularly limited.

The content of the free polymer in the water dispersion of the colorant-containing polymer particles obtained by the production process of the present invention is preferably 1.6% by weight or less and more preferably 1.2% by weight or less in view of a good ejection stability and a good optical density of the resultant ink. The lower limit of the content of the free polymer in the water dispersion is ideally 0% by weight, but is preferably 0.0004% by weight or more and more preferably 0.02% by weight or more in view of a good productivity. From these viewpoints, the content of the free polymer in the water dispersion is preferably from 0.0004 to 1.6% by weight and more preferably from 0.02 to 1.2% by weight.

The content of the free polymer in the water-based ink of the present invention is preferably 0.4% by weight or less and more preferably 0.3% by weight or less in view of a good ejection stability and a good optical density of the ink. The lower limit of the content of the free polymer in the water-based ink is ideally 0% by weight, but is preferably 0.0001% by weight or more and more preferably 0.005% by weight or more in view of a good productivity. From these viewpoints, the content of the free polymer in the water-based ink is preferably from 0.0001 to 0.4% by weight and more preferably from 0.005 to 0.3% by weight. Meanwhile, the content of the free polymer in the water dispersion or the water-based ink may be measured by the method described in Examples below.

The respective contents of the colorant-containing polymer particles and water in the water dispersion and the water-based ink for ink-jet printing are as follows in view of improving an optical density and a gloss thereof.

That is, the content of the colorant-containing polymer particles in the water dispersion and the water-based ink for ink-jet printing is preferably from 1 to 15% by weight, more preferably from 2 to 12% by weight and still more preferably from 2 to 10% by weight.

The content of water in the water dispersion and the water-based ink for ink-jet printing is preferably from 30 to 90% by weight and more preferably from 40 to 80% by weight.

The average particle size of the colorant-containing polymer particles contained in the water dispersion and the water-based ink is preferably from 0.01 to 0.5 μm, more preferably from 0.03 to 0.3 μm and still more preferably from 0.05 to 0.2 μm in view of improving an optical density and a gloss thereof. Meanwhile, the average particle size of the colorant-containing polymer particles may be measured by the method as described above using a laser particle analyzing system "ELS-8000" (cumulant analysis) available from Otsuka Denshi Co., Ltd.

The surface tension of the water dispersion of the present invention is preferably from 30 to 72 mN/m and more preferably from 35 to 72 mN/m as measured at 20° C., and the surface tension of the water-based ink of the present invention is preferably from 20 to 60 mN/m and more preferably from 22 to 55 mN/m as measured at 20° C.

The viscosity of the water dispersion having a solid content of 10% by weight is preferably from 2 to 6 mPa·s and more preferably from 2 to 5 mPa·s as measured at 20° C. to produce a water-based ink having a suitable viscosity. The viscosity of the water-based ink is preferably from 2 to 12 mPa·s and more preferably from 2.5 to 10 mPa·s as measured at 20° C. in view of maintaining a good ejection reliability thereof. Also, the pH of the water-based ink is preferably from 4 to 10.

The water-based ink for ink-jet printing according to the present invention is capable of producing printed images or characters having a high optical density upon printing on a plain paper. Examples of the plain paper include commercially available plain papers such as "Xerox 4024" (tradename) available from Xerox Corp., "PB Paper" available from Canon Corp., and "PPC Paper MY-PAPER" available from Ricoh Corp.

The ink-jet printing method using the water-based ink of the present invention is not particularly limited, and is suitably applied, in particular, to ink-jet printers of a thermal printing type.

EXAMPLES

In the following production example, examples and comparative examples, the "part(s)" and "%" indicate "part(s) by weight" and "% by weight", respectively, unless otherwise specified.

Meanwhile, the weight-average molecular weight of the polymer, the relative dielectric constant of the solvent, the amount of the free polymer contained in the water dispersion, and the solid content in the water dispersion were respectively measured by the following methods.

(1) Measurement of Weight-Average Molecular Weight of Polymer

The weight-average molecular weight of polymer produced in the following Production Example was measured by gel chromatography using N,N-dimethyl formamide containing 60 mmol/L of phosphoric acid and 50 mmol/L of lithium bromide as a solvent and using polystyrene as a standard substance. Also, as a column for the gel chromatography, there was used HLC-8120GPC available from Tosoh Corporation.

(2) Measurement of Relative Dielectric Constant of Solvent

The relative dielectric constant of the solvent was measured at a AC voltage of 100 mV, a frequency of 10 kHz and a temperature of 25° C. using a LCR meter "6440B" available from Wayne Kerr Electronics Corp.

(3) Measurement of Amount of Free Polymer

The respective water dispersions of the colorant-containing polymer particles (solid content: 25% by weight) obtained in the following Examples and Comparative Examples were subjected to ultracentrifugation using an ultracentrifuge "CP56G" available from Hitachi Koki Co., Ltd., under the condition of 30,000 rpm×3 h (20° C.), thereby obtaining a supernatant. The amount of the free polymer contained in the thus obtained supernatant was measured by the below-mentioned method for measuring the solid content. Meanwhile, the amounts of the free polymers shown in Tables 1 and 2 are values in terms of a content thereof in the water-based ink. The amount of the free polymer in the water dispersion as measured above was four times the amount thereof in the water-based ink.

(4) Method for Measuring Solid Content

The solid content in the water dispersion of the colorant-containing polymer particles was measured as follows. That is, 1 g of the water dispersion of the colorant-containing polymer particles was uniformly mixed with 10 g of sodium sulfate (mirabilite), and the obtained mixture was uniformly spread over an area of 10.5 cm² on an evaporating dish and dried using a dryer at 105° C. for 2 h under a reduced pressure of −0.07 MPa.

The solid content (wt %) was calculated from the following formula:

(Weight of Water Dispersion after Drying/Weight of Water Dispersion before Drying)×100

(5) Method for Measuring Zeta Potential

The zeta potential of the dispersion was measured at 20° C. using a zeta potential measuring apparatus "ELS-Z1" available from Otsuka Denshi Co., Ltd., equipped with a standard cell (disposable type; capacity: 0.5 mL).

Production Example 1

Twenty one parts of styrene, 15 parts of polyethylene glycol monomethacrylate "NK Ester EH-4E" (tradename) (average molar number of addition of ethyleneoxide: 4; end group: 2-ethylhexyl) available from Shin-Nakamura Kagaku Kogyo Co., Ltd., 10 parts a solution of a styrene macromer "Macro-Monomer AS-3(S)" (tradename) (number-average molecular weight: 3,000; sheer weight content: 50%) available from Toagosei Co., Ltd. and 0.2 part of 2-mercaptoethanol as a chain transfer agent were charged into a reaction vessel, and then the reaction vessel was fully purged with a nitrogen gas to thereby obtain a mixed solution.

Separately, 189 parts of styrene, 90 parts of methacrylic acid, 135 parts of the above polyethylene glycol monomethacrylate, 90 parts of the above solution of a styrene macromer, 1.8 parts of 2-mercaptoethanol as a chain transfer agent, 5 parts of 2,2'-azobis(2,4-dimethylvaleronitrile) "V-65" (tradename) available from Wako Pure Chemical Industries, Ltd., as a polymerization initiator, and 131 parts of methyl ethyl ketone, were charged into a dropping funnel to obtain a mixed solution.

The mixed solution in the reaction vessel was heated to 65° C. under stirring in a nitrogen atmosphere, and then the mixed solution in the dropping funnel was gradually dropped thereinto over 3 h. After the elapse of 2 h from completion of the dropping, a solution prepared by dissolving 4.5 parts by weight of the above polymerization initiator in 203 parts of methyl ethyl ketone was added to the obtained solution, and the resultant reaction solution was further aged at 65° C. for 2 h and then at 70° C. for 1 h to obtain a methyl ethyl ketone solution of a water-insoluble vinyl polymer.

As a result, it was confirmed that the thus obtained vinyl polymer had a weight-average molecular weight of 40,000 as measured by the above method.

Example 1

Production of Water dispersion of Pigment-Containing Polymer Particles/Dispersion Step (Steps I and II)

Into a glass container were weighed and charged 35.3 parts of the above-obtained methyl ethyl ketone solution of the water-insoluble vinyl polymer (adjusted to a solid content of 50%), 60 parts of methyl ethyl ketone, 7 parts of a sodium hydroxide aqueous solution (standard solution for titration: 5N) available from Wako Pure Chemical Industries, Ltd., and 250 parts of ion-exchanged water. The resultant mixture was mixed using a high-speed stirring disperser ("T.K. Robomix"+"T.K. Homodisper 2.5 Model") available from PRIMIX Corp., at 1500 rpm for 15 min.

The thus obtained mixture was mixed with 100 parts of a magenta pigment (Pigment Red 122; "CROMOFINE RED" (tradename) available from Dainichiseika Color & Chemicals Mfg. Co., Ltd., and stirred at 8,000 rpm for 60 min. The resultant mixture was dispersed under a high pressure of 200 MPa by passing through a dispersing apparatus "MICROFLUIDIZER MF-140K" (tradename) available from Microfluidics Corp., 19 times, thereby obtaining a dispersion of pigment-containing vinyl polymer particles.

The resultant dispersion of pigment-containing vinyl polymer particles was placed at 60° C. under reduced pressure to completely remove methyl ethyl ketone therefrom, followed by removing a part of water therefrom for concentrating the dispersion, thereby obtaining 400 parts of a water dispersion of pigment-containing vinyl polymer particles having a solid content of 25%.

(Determination of Zeta Potential of Both Groups of Fine Particles)

Fifteen grams of the water dispersion of pigment-containing vinyl polymer particles (solid content: 25%) obtained in the previous dispersion step was filled in a centrifugal settling tube (scale: 40 mL) and subjected to centrifugal separation using a centrifugal separator "CG56G" available from Hitachi Limited at 30,000 rpm for 3 h, thereby separating the water dispersion into 9.5 g of a supernatant component and 5.5 g of precipitates.

The thus separated precipitates were filled in a 20 mL glass sampling tube, mixed with 20 g of water, and then subjected to supersonic re-dispersion procedure for 10 min using a supersonic cleaner "AU-16C" available from Aiwa Ika Kogyo Co., Ltd. As a result, the precipitates were completely redispersed. The resultant redispersed solution was concentrated using a rotary evaporator to adjust a solid content thereof again to 25%, and then filtered through a 5 μm-mesh membrane filter, thereby obtaining a water dispersion of pigment-containing vinyl polymer particles containing no free polymer. The thus obtained water dispersion of the pigment-containing vinyl polymer particles was mixed with ion-exchanged water to adjust a solid content thereof to 2%. The zeta potential of the polymer particles was measured by the above method. As a result, it was confirmed that the zeta potential of the polymer particles was −12 mV (20° C.).

Also, the above obtained supernatant component was filtered through a 5 μm-mesh membrane filter, thereby obtaining a free polymer having a solid content of 2.0%. The zeta potential of the free polymer having a solid content of 2.0% was measured by the above method. As a result, it was confirmed that the zeta potential of the free polymer was −25 mV (20° C.).

From the above results, it was confirmed that the groups of fine particles which were different in zeta potential from each other were contained in the water dispersion of the pigment-containing vinyl polymer particles obtained in the dispersion step of Example 1.

[Production of Water Dispersion of Pigment-Containing Polymer Particles/Purification Step (Steps III and IV)]

Next, a 1 L angle rotor for centrifugal separation "R7AF2" available from Hitachi Koki Co., Ltd., was charged with 400 parts of methanol (relative dielectric constant: 33), and then 200 parts of the water dispersion obtained in the previous dispersion step was dropped thereinto. The mixed solution composed of the water dispersion and methanol was stirred at 25° C. and 150 rpm for 5 min to aggregate and precipitate the pigment-containing vinyl polymer particles. Meanwhile, the weight ratio between the solid component in the water dispersion and methanol and the relative dielectric constant of the resultant mixed solvent are shown in Table 1. The relative dielectric constant of the mixed solvent was determined as follows. The water dispersion of the pigment-containing vinyl polymer particles which was separated above for measuring the zeta potential was mixed with methanol at various mixing ratios to observe the dispersing and aggregating conditions in the methanol/water mixed solvent, thereby determining the mixing ratio between methanol and water at which the pigment-containing vinyl polymer particles underwent aggregation. At that time, the relative dielectric constant of the mixed solvent was measured using a relative dielectric constant meter to attain a relative dielectric constant ($\alpha$) of the mixed solvent to be set.

Next, the angle rotor was loaded into a high-speed cooling centrifuge "himac CR7" (controlled to 20° C.) available from Hitachi Koki Co., Ltd., to subject the contents of the angle rotor to centrifugal separation at 6,000 rpm for 10 min, thereby discarding an upper layer containing a suspended component (free polymer-containing component) and recovering a lower solid layer in a glass container.

The thus obtained solids were mixed with 200 parts of ion-exchanged water, and the resultant mixture was stirred using a high-speed stirring disperser at 6,000 rpm for 20 min and then heated to 60° C. to completely remove methanol therefrom, thereby obtaining a water dispersion. The thus obtained water dispersion was dispersed under a high pressure of 150 MPa by passing through a dispersing apparatus "MICROFLUIDIZER MF-140K" (tradename) available from Microfluidics Corp., 10 times, thereby obtaining a water dispersion of pigment-containing vinyl polymer particles containing a redispersed solid component in an amount of 20%.

The obtained water dispersion was treated again using the above high-speed cooling centrifuge at 6,000 rpm for 10 min to allow the aggregates still non-redispersed to be dispersed in the water dispersion, and further filtered through the above 5 μm-mesh syringe filter "SM17594K" (made of cellulose acetate) available from Saltrius Inc., thereby obtaining a water dispersion.

The zeta potential of the thus obtained water dispersion was measured under the same conditions as used above. As a result, it was confirmed that the zeta potential of the water dispersion was −12 mV as measured at 20° C. which was the same value as that of the polymer particles separated by the above centrifugal separation. Also, the zeta potential of the suspended component discarded (free polymer-containing component) was measured under the same conditions as used above. As a result, it was confirmed that the zeta potential of the suspended component was −25 mV as measured at 20° C. which was the same value as that of the supernatant separated by the above centrifugal separation.

Meanwhile, the above relative dielectric constant of methanol is the value (as measured at 25° C.) described in ASAHARA, Shozo, et al., "Handbook for Solvents", Kodan-sha, 1976.

Examples 2 to 5

Production of Water dispersion of Pigment-Containing Polymer Particles

The same procedure as in Example 1 was repeated except for using the respective organic solvents shown in Table 1 in place of methanol, thereby obtaining a water dispersion of pigment-containing vinyl polymer particles having a solid content of 25%.

Example 6

Production of Water dispersion of Pigment-Containing Polymer Particles

The same procedure as in Example 1 was repeated except for using a yellow pigment (Pigment Yellow 74; "Fast Yellow" (tradename) available from Sanyo Color Works, Ltd.) in place of the magenta pigment and further using isopropanol in place of methanol, thereby obtaining a water dispersion of pigment-containing vinyl polymer particles having a solid content of 25%.

Example 7

Production of Water dispersion of Pigment-Containing Polymer Particles

The same procedure as in Example 1 was repeated except for using a copper phthalocyanine pigment (Pigment Blue 15:4; "Lionol Blue" (tradename) available from Toyo Ink Mfg. Co., Ltd.) in place of the magenta pigment and further using isopropanol in place of methanol, thereby obtaining a water dispersion of pigment-containing vinyl polymer particles having a solid content of 25%.

Example 8

Production of Water dispersion of Pigment-Containing Polymer Particles

The same procedure as in Example 1 was repeated except for using a carbon black pigment (Pigment Black 7; "Monarch 880" (tradename) available from Cabot Specialty Chemicals Inc.) in place of the magenta pigment and further using isopropanol in place of methanol, thereby obtaining a water dispersion of pigment-containing vinyl polymer particles having a solid content of 25%.

Comparative Example 1

Production of Water dispersion of Pigment-Containing Polymer Particles

The same dispersing step as in Example 1 was conducted to obtain 400 parts of a water dispersion of pigment-containing vinyl polymer having a solid content of 25%.

Next, without being subjected to the "purification step" conducted in Example 1, the obtained water dispersion was treated using the above high-speed cooling centrifuge at 6,000 rpm for 10 min to allow coarse particles contained in the water dispersion to be dispersed therein, filtered through the above 5 μm-mesh syringe filter, and then mixed with ion-exchanged water to control the concentration thereof, thereby obtaining a water dispersion of pigment-containing vinyl polymer particles having a solid content of 25%.

Comparative Example 2

Production of Water Dispersion of Pigment-Containing Polymer Particles

The same procedure as in Example 1 was repeated except for using toluene (relative dielectric constant: 2) in place of methanol, thereby obtaining a water dispersion of pigment-containing polymer particles having a solid content of 25%.

Comparative Example 3

Production of Water Dispersion of Pigment-Containing Polymer Particles

The same dispersing step as in Example 1 was conducted except for using 70 parts of a yellow pigment (Pigment Yellow 74; "Fast Yellow" (tradename) available from Sanyo Color Works, Ltd.) in place of 100 parts of the magenta pigment, thereby obtaining a water dispersion of pigment-containing vinyl polymer particles having a solid content of 25%.

Next, the same purification step as in Example 1 was conducted except for changing the weight ratio of the solid component in the water dispersion to isopropanol [solid component in water dispersion/isopropanol] to 1/1 to adjust the relative dielectric constant of the mixed solvent to 70. At this time, however, there occurred no aggregation of the polymer particles in the dispersion system, thereby failing to subject the dispersion to separation procedure. Thereafter, isopropanol was distilled off from the dispersion using a rotary evaporator to control the solid content in the water dispersion to 25%.

Comparative Example 4

Production of Water dispersion of Pigment-Containing Polymer Particles

The same procedure as in Example 1 was repeated except for using 4,000 parts of isopropanol in place of 400 parts of methanol, thereby obtaining a water dispersion of pigment-containing polymer particles having a solid content of 25%.

Examples 9 to 16 and Comparative Examples 5 TO 8

Production of Water-Based Ink

Four parts by weight of 2-pyrrolidone, 4 parts of 1,5-pentanediol, 1 part of an ethyleneoxide adduct of acetylene glycol ("ACETYLENOL E100" (tradename) available from Kawaken Fine Chemicals Co., Ltd.; average molar number of addition of ethyleneoxide: 10) and 28.5 parts of ion-exchanged water were added to and mixed with 12.5 parts of the water dispersion of pigment-containing polymer particles, having a solid content of 25%, obtained in each of Examples 1 to 8 and Comparative Examples 1 to 4. The resultant mixture was filtered through a 1.2 μm-mesh filter (made of cellulose acetate) available from Saltrius Inc., thereby obtaining a water-based ink containing the respective water dispersion of pigment-containing polymer particles.

The water-based inks obtained in Examples 9 to 16 and Comparative Examples 5 to 8 were subjected to evaluations of an ejection stability and an optical density thereof by the following methods. The results are shown in Tables 1 and 2.

(1) Ejection Stability

The ink was loaded in a black head portion of an ink-jet printer of a thermal printing type "Model No. Deskjet 6840" (mode set: high image quality mode) commercially available from Hewlett Packard Corp., to print one line pattern per nozzle and a solid image (duty: 100%) on a plain paper "Xerox 4024" (tradename) available from Xerox Corp. Among the 640 nozzles using for printing the one line pattern, the number of nozzles which suffered from deflected ejection or failed ejection of the ink was counted to evaluate an ejection stability of the ink according to the following evaluation criteria.

⊚: Defective ejection occurred at less than 5 nozzles;

○: Defective ejection occurred at not less than 5 but less than 10 nozzles;

Δ: Defective ejection occurred at not less than 10 but less than 50 nozzles; and x: Defective ejection occurred at not less than 50 nozzles.

(2) Optical Density

Solid image printing (duty: 100%) was carried out on a plain paper "XEROX 4024 (tradename)" commercially available from Xerox Corp., using the same ink-jet printer as used in the above (1). After allowing the printed paper to stand at 25° C. for 24 h, the optical density was measured at five positions of the printed paper (5.1 cm×8.0 cm) including a center and four corners thereof using a Macbeth densitometer "SPECTRO-EYE" (product name) available from Gretag-Macbeth Corp., to calculate an average of the measured values.

TABLE 1

| | | Examples (Water dispersion) | | | |
|---|---|---|---|---|---|
| | | 1 | 2 | 3 | 4 |
| | | Examples (Water-based ink) | | | |
| | | 9 | 10 | 11 | 12 |
| Kind of pigment | | Magenta | Magenta | Magenta | Magenta |
| | | Purification conditions | | | |
| Organic solvent (B) | Kind | Methanol | IPA*[1] | 1-Butanol | Acetone |
| | Relative dielectric constant*[3] | 33 | 18 | 17 | 21 |
| Relative dielectric constant of mixed solvent*[4] | | 45 | 35 | 34 | 36 |
| Weight ratio of solid component*[5]/organic solvent (B) | | 1/8 | 1/8 | 1/8 | 1/8 |
| | | Test results | | | |
| Amount of free polymer (wt %) | | 0.27 | 0.11 | 0.16 | 0.18 |
| Ejection stability | | ○ | ⊚ | ○ | ○ |
| Optical density | | 1.10 | 1.24 | 1.18 | 1.14 |

TABLE 1-continued

|  |  | Examples (Water dispersion) | | | |
|---|---|---|---|---|---|
|  |  | 5 | 6 | 7 | 8 |
|  |  | Examples (Water-based ink) | | | |
|  |  | 13 | 14 | 15 | 16 |
| Kind of pigment | | Magenta | Yellow | Cyan | Carbon black |
| Purification conditions | | | | | |
| Organic solvent (B) | Kind | MEK*2 | IPA*1 | IPA*1 | IPA*1 |
|  | Relative dielectric constant*3 | 16 | 18 | 18 | 18 |
| Relative dielectric constant of mixed solvent*4 | | 33 | 35 | 35 | 35 |
| Weight ratio of solid component*5/organic solvent (B) | | 1/8 | 1/8 | 1/8 | 1/8 |
| Test results | | | | | |
| Amount of free polymer (wt %) | | 0.15 | 0.001 | 0.03 | 0.05 |
| Ejection stability | | ○ | ◉ | ◉ | ◉ |
| Optical density | | 1.18 | 1.22 | 1.22 | 1.28 |

Note
*1 Isopropanol
*2 Methyl ethyl ketone
*3 The value (25° C.) described in ASAHARA, Shozo, et al., "Handbook for Solvents", Kodan-sha, 1976
*4 Relative dielectric constant of a mixed solvent composed of a dispersing medium of the water dispersion and the organic solvent (B)
*5 Weight ratio of solid component contained in the water dispersion used in the purification step to the organic solvent (B)

TABLE 2

|  |  | Comparative Examples (Water dispersion) | | | |
|---|---|---|---|---|---|
|  |  | 1 | 2 | 3 | 4 |
|  |  | Comparative Examples (Water-based ink) | | | |
|  |  | 5 | 6 | 7 | 8 |
| Kind of pigment | | Magenta | Magenta | Yellow | Magenta |
| Purification conditions | | | | | |
| Organic solvent (B) | Kind | None | Toluene | IPA*1 | IPA*1 |
|  | Relative dielectric constant*2 | — | 2 | 18 | 18 |
| Relative dielectric constant of mixed solvent*3 | | 78 | 21 | 70 | 24 |
| Weight ratio of solid component*4/organic solvent (B) | | — | 1/8 | 1/1 | 1/80 |
| Test results | | | | | |
| Amount of free polymer (wt %) | | 0.66 | 0.60 | 0.48 | 0.61 |
| Ejection stability | | X | X | X | X |
| Optical density | | 0.98 | 0.95 | 1.18 | 0.95 |

Note
*1 Isopropanol
*2 The value (25° C.) described in ASAHARA, Shozo, et al., "Handbook for Solvents", Kodan-sha, 1976
*3 Relative dielectric constant of a mixed solvent composed of a dispersing medium of the water dispersion and the organic solvent (B)
*4 Weight ratio of solid component contained in the water dispersion used in the purification step to the organic solvent (B)

From the results shown in Tables 1 and 2, it was confirmed that the water-based inks obtained in Examples 9 to 16 had a less content of free polymer and were excellent in ejection stability and optical density as compared to those obtained in Comparative Examples 5 to 8. In Comparative Examples 2 to 4, substantially no free polymer was separated therefrom.

Industrial Applicability

The water-based ink for ink-jet printing according to the present invention is excellent in ejection stability and capable of producing printed images and characters having a high optical density upon printing on a plain paper, and is therefore applicable, in particular, to an ink-jet printer of a thermal printing type. Also, in the process for producing a water dispersion for ink-jet printing and the process for purifying the water dispersion according to the present invention, a water dispersion of colorant-containing polymer particles for ink-jet printing which is included in the above water-based ink can be produced in an efficient manner. In addition, in the process for producing a dispersion containing groups of fine particles according to the present invention, the groups of fine particles which are different in absolute value of zeta potential from each other can be separated into the individual groups in an industrially facilitated manner. Further, when adding the thus separated group of fine particles to a water dispersion for ink-jet printing or a water-based ink containing the water dispersion, the resultant dispersion and ink can be used in extensive applications such as inks, paints, drugs, cosmetics and coating compositions.

The invention claimed is:

1. A process for producing a water dispersion for ink-jet printing containing particles of a polymer which contain a colorant, comprising the following steps I to IV:
    Step I: dispersing a mixture containing a polymer, a colorant, an organic solvent (A) and water to obtain a dispersion of colorant-containing polymer particles;
    Step II: removing the organic solvent (A) from the dispersion obtained in the step I to obtain a water dispersion of the colorant-containing polymer particles;
    Step III: mixing the water dispersion obtained in the step II with an organic solvent (B) to control a relative dielectric constant ($\alpha$) of a mixed solvent of dispersing medium of the water dispersion and the organic solvent (B), wherein the relative dielectric constant ($\alpha$) of the mixed solvent is controlled to from 27 to 62, thereby precipitating the polymer particles; and
    Step IV: separating precipitates obtained in the step III from the dispersion and re-dispersing the precipitates in a water-based solvent.

2. The process according to claim 1, wherein the organic solvent (B) has a relative dielectric constant of from 5 to 40.

3. The process according to claim 1, wherein a weight ratio of a solid component contained in the water dispersion obtained in the step II to the organic solvent (B) [solid component/organic solvent (B)] which are present in the step III is from 1/70 to 1/3.

4. The process according to claim 1, wherein the water dispersion obtained in the step II and the organic solvent (B) are mixed with each other in the step III by adding the water dispersion to the organic solvent (B).

5. The process according to claim 1, wherein the colorant is a pigment.

6. The process according to claim 1, wherein the polymer is a graft polymer containing a constitutional unit derived from (a) a salt-forming group-containing monomer and a constitutional unit derived from (c) a hydrophobic monomer in a main chain thereof, and a constitutional unit derived from (b) a macromer in a side chain thereof.

7. A process for purifying a water dispersion for ink-jet printing containing particles of a polymer which contain a colorant, comprising the following steps 1 and 2:

Step 1: mixing the water dispersion of colorant-containing polymer particles with an organic solvent (B) to control a relative dielectric constant (α) of a mixed solvent of a dispersing medium of the water dispersion and the organic solvent (B), wherein the relative dielectric constant (α) of the mixed solvent is controlled to from 27 to 62, thereby precipitating the polymer particles; and Step 2: separating precipitates obtained in the step 1 from the dispersion and re-dispersing the precipitates in a water-based solvent.

8. A process for producing a dispersion containing groups of fine particles, comprising the following steps i, and ii or iii:

Step i: mixing a water dispersion containing 2 or more kinds of groups of fine particles which are different in zeta potential from each other, with an organic solvent to control a relative dielectric constant (α) of a mixed solvent of a dispersing medium of the water dispersion and the organic solvent, thereby precipitating the group of fine particles having a small absolute value of zeta potential, wherein a difference between the larger and small absolute values of zeta potential is 5 mV or more;

Step ii: separating precipitates obtained in the step i from the dispersion and re-dispersing the precipitates in a solvent having a larger relative dielectric constant than the relative dielectric constant (α) of the mixed solvent, thereby obtaining a dispersion containing the group of fine particles having a small absolute value of zeta potential, wherein a difference between the relative dielectric constant of the solvent and the relative dielectric constant (α) of the mixed solvent is 3 or more; and Step iii: separating and removing the precipitates obtained in the step i from the dispersion to obtain a dispersion containing the group of fine particles having a large absolute value of zeta potential.

9. The process according to claim 8, wherein at least one of the groups of fine particles is a group of colorant-containing polymer particles.

* * * * *